United States Patent
Chu (10) Patent No.: US 10,330,854 B2
(45) Date of Patent: Jun. 25, 2019

(54) DISPLAY APPARATUS FREE FROM LIGHT GUIDE PLATE AND MANUFACTURING METHOD THEREOF

(71) Applicant: E Ink Holdings Inc., Hsinchu (TW)

(72) Inventor: Chun-Wei Chu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 15/922,844

(22) Filed: Mar. 15, 2018

(65) Prior Publication Data

US 2018/0275335 A1 Sep. 27, 2018

(30) Foreign Application Priority Data

Mar. 24, 2017 (CN) .......................... 2017 1 0180623

(51) Int. Cl.
*F21V 8/00* (2006.01)
(52) U.S. Cl.
CPC .......... *G02B 6/0065* (2013.01); *G02B 6/005* (2013.01); *G02B 6/009* (2013.01); *G02B 6/0088* (2013.01)
(58) Field of Classification Search
CPC .... G02B 6/0065; G02B 6/0088; G02B 6/005; G02B 6/009
See application file for complete search history.

(56) References Cited

U.S. PATENT DOCUMENTS

| | | | |
|---|---|---|---|
| 6,118,503 A * | 9/2000 | Oki | G02B 6/003 349/65 |
| 6,312,787 B1 * | 11/2001 | Hayashi | B29C 47/065 362/331 |
| 6,693,690 B2 * | 2/2004 | Umemoto | G02B 6/0036 349/113 |
| 7,421,180 B2 | 9/2008 | Kuo et al. | |
| 8,827,526 B2 | 9/2014 | Chen et al. | |
| 2001/0019379 A1 | 9/2001 | Ishihara | |
| 2004/0008398 A1 | 1/2004 | Amundson | |
| 2010/0027293 A1 * | 2/2010 | Li | G02B 6/002 362/619 |
| 2013/0250203 A1 | 9/2013 | Zhou | |
| 2014/0125601 A1 * | 5/2014 | Chen | G06F 3/041 345/173 |
| 2014/0286045 A1 | 9/2014 | Pao et al. | |

(Continued)

FOREIGN PATENT DOCUMENTS

| | | |
|---|---|---|
| JP | 2004133167 A | 4/2004 |
| TW | 589477 B | 6/2004 |
| TW | 201419062 A | 5/2014 |

OTHER PUBLICATIONS

Nagahara et al, Japanese patent application publication 2004-133167, Apr. 2004, machine translation.*
Corresponding Taiwan Office Action dated Jan. 10, 2018.

*Primary Examiner* — Tracie Y Green
(74) *Attorney, Agent, or Firm* — CKC & Partners Co., LLC (57) ABSTRACT

A display apparatus includes a light source, a display panel and a light guide glue. The display panel includes a display surface and a sidewall extending downward from the display surface. The light guide glue is in contact with the display surface and the sidewall of the display panel to adhere to the display panel. A light travel path from the light source to the display panel passes through the light guide glue. The light travel path from the light source to the display panel is free from passing a light guide plate.

15 Claims, 7 Drawing Sheets

(56) References Cited

U.S. PATENT DOCUMENTS

| | | |
|---|---|---|
| 2015/0004382 A1 | 1/2015 | Menon et al. |
| 2015/0124483 A1 | 5/2015 | Lee et al. |
| 2015/0160505 A1 | 6/2015 | Saimen |
| 2015/0219908 A1* | 8/2015 | Lee ................ G02B 27/22 359/463 |
| 2016/0223733 A1 | 8/2016 | Gu et al. |

* cited by examiner

DISPLAY APPARATUS FREE FROM LIGHT GUIDE PLATE AND MANUFACTURING METHOD THEREOF

RELATED APPLICATIONS

This application claims priority to China Application Serial Number 201710180623.5, filed Mar. 24, 2017, which is herein incorporated by reference.

BACKGROUND

Technical Field

The present disclosure relates to a display apparatus, especially to a display apparatus free from a light guide plate.

Description of Related Art

In general, since a reflective display panel itself does not emit light, its brightness is quite reliant on ambient light. Once the reflective display panel is placed in a dark environment, the reflective display panel is often rendered unusable. Therefore, a front light module is disposed on the reflective display panel, so as to provide an additional illumination to the reflective display panel to display a image when there is no or low level of illumination from ambient light.

A typical front light module includes a light source and a light guide plate. The light guide plate is located over the reflective display panel, and the main material of the light guide plate is poly(methyl methacrylate) (PMMA). The light source is located on a lateral surface of the light guide plate, so as to emit light into the light guide plate through the lateral surface. The bottom surface of the light guide plate guides the light into the reflective display panel, so as to enable the reflective display panel to reflect the light, which allows a user to see images shown by the reflective display panel.

SUMMARY

Embodiments of the present disclosure provide a display apparatus, which uses a light guide glue instead of a light guide plate. Therefore, costs of designing and manufacturing the light guide plate are reduced since the display apparatus is free from any light guide plate. The techniques used in the present disclosure can solve issues with regard to the display apparatus with small size, such as difficulties of manufacturing the small-sized light guide plate and challenges of guiding light by the small-sized light guide plate.

In some embodiments in the present disclosure, a display apparatus includes a light source, a display panel and a light guide glue. The display panel includes a display surface and a sidewall extending downward from the display surface. The light guide glue is in contact with the display surface and the sidewall of the display panel to adhere to the display panel. A light travel path from the light source to the display panel passes through the light guide glue, and the light travel path from the light source to the display panel is free from passing any light guide plate.

In some embodiments, the display panel has a non-display surface opposite to the display surface, and a minimum distance between a light guide glue and a light source is less than a minimum distance between the display surface and the light source.

In some embodiments, the display panel has a non-display surface opposite to the display surface. The display surface is located in a position higher than the non-display surface, and the light source is located in a position lower than the non-display surface.

In some embodiments, the display panel has a non-display surface opposite to the display surface. The light source is located in a position higher than the display surface, and the non-display surface is located in a position lower than the display surface.

In some embodiments, the light guide glue has a recess, and the display panel is embedded in the recess. The display surface is adhered to a surface of the recess.

In some embodiments, the display apparatus further includes a frame defining a space. The display apparatus is located in the space, and the space is filled with the light guide glue.

In some embodiments, the frame includes a first frame portion and a second frame portion opposite to each other. A portion of the light guide glue is adhered between the first frame portion and a sidewall of a display panel.

In some embodiments, the display apparatus further includes a support substrate. The support substrate and the frame define the above-mentioned space.

In some embodiments, the display apparatus further includes a protrusion. The protrusion protrudes from an inner frame wall of the frame. A portion of the light guide glue is located between the light source and the protrusion.

In some embodiments, the light source is embedded in the frame.

In some embodiments, the light guide glue has an upper surface. The frame has a top surface level with the upper surface of the light guide glue.

In some embodiments, the display apparatus further includes a support substrate extending along a non-display surface of the display panel and a lower surface of the light guide glue.

In some embodiments, the display apparatus further includes a stack located on the display panel and adhered by the light guide glue.

In some embodiments, the display apparatus further includes a cover lens covering the light guide glue, and the cover lens is light permeable.

In some embodiment, a method for manufacturing the display apparatus as described above comprises providing a frame with a space; depositing the display panel and the light source in the space; and filling the light guide glue in the space to cover or encapsulate the display panel.

In the foregoing embodiments, since a light travel path from the light source to the display panel passes through the light guide glue, the light guide glue can be used to guide the light emitted by the light source, so that the light can go into the display panel. Since the light guide glue achieves a light guiding effect, the light travel path from the light source to the display panel is free from passing any light guide plate. Therefore, costs of designing and manufacturing the light guide plate are saved since the light guide plate can be omitted in the display apparatus.

It is to be understood that both the foregoing general description and the following detailed description are by examples, and are intended to provide further explanation of the disclosure as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
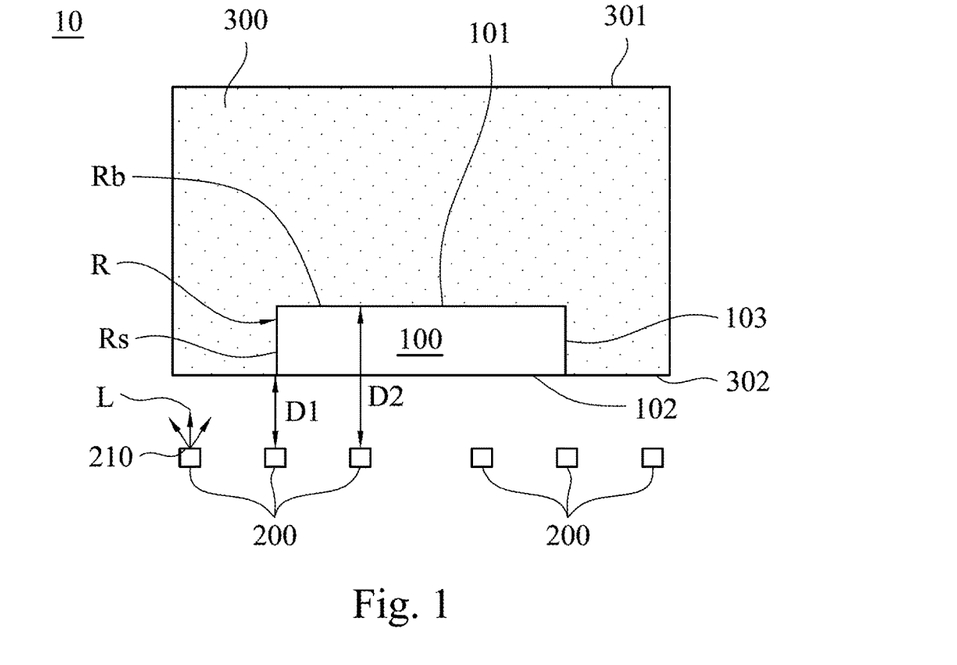
FIG. 1 is a cross-sectional view of a display apparatus in accordance with one embodiment of the present disclosure.

FIG. 1 is a cross-sectional view of a display apparatus 10 in accordance with one embodiment of the present disclosure. As shown in FIG. 1, the display apparatus 10 includes a display panel 100, one or more light sources 200 and a light guide glue 300. The light guide glue 300 is adhered to the display panel 100. In particular, the light guide glue 300 can cover and be in contact with the display panel 100, so the light guide glue 300 can adhere to the display panel 100 by using its stickiness. The light source 200 has a light emitting surface 210 facing the light guide glue 300. Therefore, the light emitted from the light emitting surface 210 of the light source 200 (e.g., light L as shown in FIG. 1) can be guided to the display panel 100 by the light guide glue 300. That is to say, the light L emitted by the light source 200 passes through the light guide glue 300 to the display panel 100.

Specifically, due to a difference of the refractive index between the light guide glue 300 and the ambience around the light guide glue 300, the light can be reflected in the light guide glue 300 and arrive at the display panel 100. For example, the ambience around the light guide glue 300 can be air. Since the air and the light guide glue 300 have different refractive indexes, the light can be reflected back to the light guide glue 300 when the light arrives at a boundary between the air and the light guide glue 300. Based on this principle, the light can be reflected in the light guide glue 300 and guided to the display panel 100. Since the light guide glue 300 can guide a light emitted from the light source 200 to the display panel 100, the light guide glue 300 is capable of adhering the display panel 100 as well as guiding light. Since the light guide glue 300 has a light guiding ability, a light guide plate can be omitted from a light travel path from the light source 200 to the display panel 100. In other words, a light travel path from the light source 200 to the display panel 100 can be free from passing through any light guide plate. As a result, the display apparatus 10 can include no light guide plate, so as to significantly save the costs of designing and manufacturing the light guide plate.

In some embodiments, the display panel 100 is a reflective display panel, for example, but is not limited to, an electrophoretic display (EPD). In such an embodiment, the display panel 100 can have a display surface 101 and a non-display surface 102 opposite to each other. For example, in the embodiment as shown in FIG. 1, the display surface 101 is an upper surface of the display panel 100, and the non-display surface 102 is a lower surface of the display panel 100. In some embodiments, the display surface 101 and the non-display surface 102 can both be light permeable surfaces. Specifically, the whole display panel 100 can be light permeable or transparent, so the display surface 101 and the non-display surface 102 are both light permeable or transparent. In other embodiments, the display surface 101 is a light permeable surface, and the non-display surface 102 is an opaque surface. When the display panel 100 is a reflective display panel, the display surface 101 can act as both a light incident surface and a light emitting surface of the display panel 100. In detail, light outside the display panel 100 can enter the display panel 100 through the display surface 101 and be reflected by the display panel 100. The reflective light can exit the display panel 100 through the display surface 101.

In some embodiments, a minimum distance D1 between the light guide glue 300 and the light source 200 is less than a minimum distance D2 between the display surface 101 and the light source 200. In other words, the light guide glue 300 is closer to the light source 200 than the display surface 101 being. Therefore, all light emitted by the light source 200 passes through the light guide glue 300 prior to arriving at the display surface 101, so that the light guide glue 300 can guide the light to the display surface 101.

In some embodiments, the light source 200 is located on a back side of (or below) the display panel 100. Specifically, the display surface 101 is located on a front side of (or above) the non-display surface 102. The light source 200 is located on a back side of (or below) the non-display surface 102. That is to say, the display surface 101 and the light source 200 are respectively located on opposite sides of the non-display surface 102. Although the light source 200 is located on the back side of the display panel 100, the light guide glue 300, as shown in FIG. 1, can still guide the light from the back side of the display panel 100 to the display surface 101 of the display panel 100, and thereby contribute to image displaying.

In particular, the light guide glue 300 has a recess R. The display panel 100 is embedded in the recess R, and the display surface 101 of the display panel 100 is in contact with a bottom surface Rb of the recess R. The display panel 100 further has a sidewall 103 extending downward from the display surface 101 to the non-display surface 102. In other words, the sidewall 103 is connected between the display surface 101 and the non-display surface 102. The sidewall 103 of the display panel 100 is in contact with a sidewall Rs of the recess R. That is to say, the light guide glue 300 can be in contact with the display surface 101 and the sidewall 103 of the display panel 100, and hence the light guide glue 300 can be adhered to the display surface 101 and the sidewall 103.

By using such a configuration, when the light is emitted from the light emitting surface 210 of the light source 200, the light can go into a portion of the light guide glue 300 located beside the sidewall 103 of the display panel 100, and then go to another portion of the light guide glue 300 located above the display panel 100. Subsequently, the light can arrive at the display surface 101 of the display panel 100 by being reflected in the light guide glue 300. That is to say, because the display panel 100 is embedded in the light guide glue 300, the light emitted by the light source 200, located on the back side of (or below) the display panel 100, can also be guided to the display surface 101 of the display panel 100 by the light guide glue 300.

In some embodiments, the display panel 100 and the recess R of the light guide glue 300 can have the same geometry. That is to say, the display panel 100 and the recess R can have the same shape and size such that the display panel 100 can be tightly embedded in the recess R. In some embodiments, the light guide glue 300 has an upper surface 301 and a lower surface 302 opposite to each other. The recess R is formed in the lower surface 302. That is to say, the display panel 100 is embedded in the lower surface 302 of the light guide glue 300.

In some embodiments, the light guide glue 300 does not have any portion located on the non-display surface 102. For example, the lower surface 302 of the light guide glue 300 can be level with the non-display surface 102 of the display panel 100, so the light guide glue 300 does not have any portion located on the non-display surface 102. In other embodiments, the light guide glue 300 can also extend on the non-display surface 102 of the display panel 100 to provide an additional light guiding ability.

Although in FIG. 1 the light source 200 and the light guide glue 300 are arranged in a spaced apart manner, in some embodiments, the light source 200 can also be adhered by the light guide glue 300. For example, the light source 200 can be embedded in or be encapsulated by the light guide glue 300. That is to say, the light emitting surface 210 of the light source 200 can be in contact with the light guide glue 300 so as to benefit the light guide glue 300 to guide the light to the display surface 101 of the display panel 100. Specifically, in some embodiments, both the light source 200 and the display panel 100 can be encapsulated in the light guide glue 300.

In some embodiments, the light guide glue 300 can be, but is not limited to, an optical clear adhesive (OCA) or other suitable materials having light guiding ability and stickiness. In some embodiments, the light source 200 can be, but is not limited to, a light emitting diode (LED) or other suitable light emitting devices.

Figure 2:
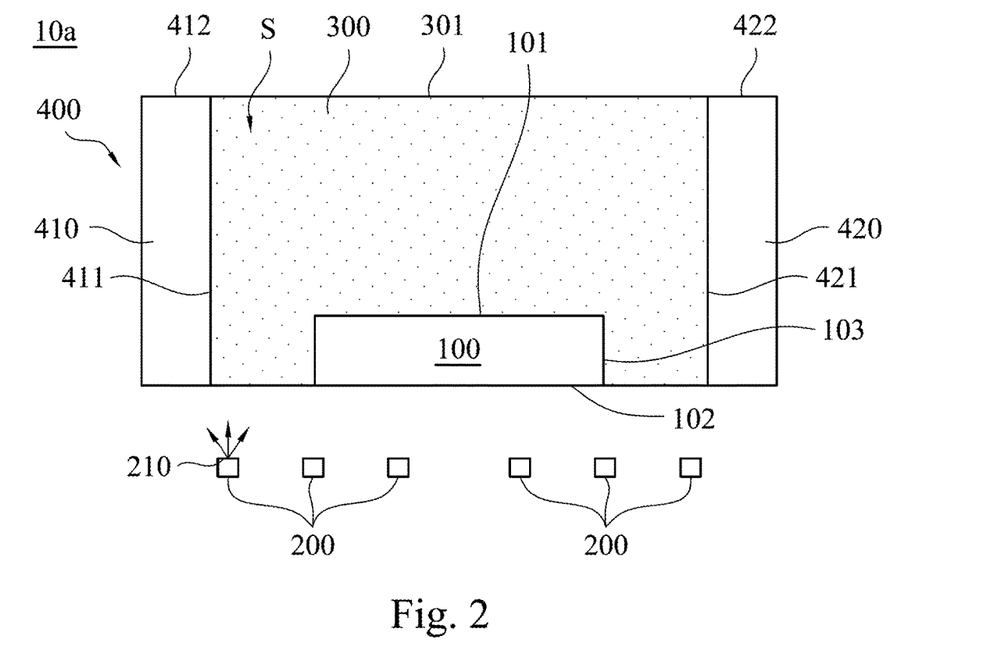
FIG. 2 is a cross-sectional view of a display apparatus in accordance with another embodiment of the present disclosure.

FIG. 2 is a cross-sectional view of a display apparatus 10a in accordance with another embodiment of the present disclosure. As shown in FIG. 2, the main difference between the display apparatus 10a and the display apparatus 10 in FIG. 1 is that: the display apparatus 10a can further include a frame 400 defining a space S. In other words, the frame 400 is provided with the space S. The display panel 100 is located in the space S defined by the frame 400, and the space S is filled with the light guide glue 300. For example, in some embodiments, the light guide glue 300 is filled in the space S to cover or encapsulate the display panel 100. By using such a configuration, the frame 400 can contribute to defining the shape, location, size of the light guide glue 300 to assist the light guide glue 300 in covering or encapsulating the display panel 100, so that the light guiding ability can be improved. In some embodiments, the display panel 100 and the light sources 200 are deposited in the space S.

In some embodiments, the frame 400 includes a first frame portion 410 and a second frame portion 420 opposite to each other. A portion of the light guide glue 300 is located between the first frame portion 410 and a sidewall of the display panel 100 (e.g., a left sidewall of the display panel 100 shown in FIG. 2), and is adhered to the first frame portion 410 and the sidewall. Another portion of the light guide glue 300 is located between the second frame portion 420 and another sidewall of the display panel 100 (e.g., a right sidewall of the display panel 100 shown in FIG. 2), and is adhered to the second frame portion 420 and the sidewall. In this way, the display panel 100 can be surrounded by the light guide glue 300, and hence can facilitate the light guide glue 300 to guide the light emitted from the underlying light source 200 to the display surface 101 atop the display panel 100. Although in the embodiment shown in FIG. 2, the first frame portion 410 and the display panel 100 are spaced apart by the light guide glue 300, the first frame portion 410 and the display panel 100 can have no interval therebetween in other embodiments. For example, the first frame portion 410 can be in contact with the display panel 100. Similarly, the second frame portion 420 can be in contact with the display panel 100 as well.

In some embodiments, the first frame portion 410 has a first inner frame wall 411. The second frame portion 420 has a second inner frame wall 421. The first inner frame wall 411 and the second inner frame wall 421 face each other. In some embodiments, the first inner frame wall 411 can be parallel to the second inner frame wall 421. Both the first inner frame wall 411 and the second inner frame wall 421 can be fully covered by the light guide glue 300. That is to say, the entire first inner frame wall 411 and the entire second inner frame wall 421 can be both covered with the light guide glue 300. The light guide glue 300 can therefor fill the space S defined by the frame 400. That is to say, the size, shape and location of the light guide glue 300 can be defined by the frame 400. In some embodiments, the first inner frame wall 411 and the second inner frame wall 421 can have a reflective material or be disposed with other reflective features, so as to reflect the light back to the light guide glue 300. For example, a silver reflective sheet can be attached to or coated on the first inner frame wall 411 and the second inner frame wall 421, but other reflective features are available as well.

The first frame portion 410 of the frame 400 has a first top surface 412. The second frame portion 420 of the frame 400 has a second top surface 422. In some embodiments, the first top surface 412, the second top surface 422 and an upper surface 301 of the light guide glue 300 can be level with each other. In some embodiments, such a level structure is formed by performing a grinding or polishing process to the light guide glue 300.

In some embodiments, the frame 400 is a monolithic annular frame, and the contour of the annular frame may be, but is not limited to, a circle or other polygons. The first frame portion 410 and the second frame portion 420 are two opposite portions of the annular frame. In other embodiments, the first frame portion 410 and the second frame portion 420 are not monolithically connected.

Figure 3:
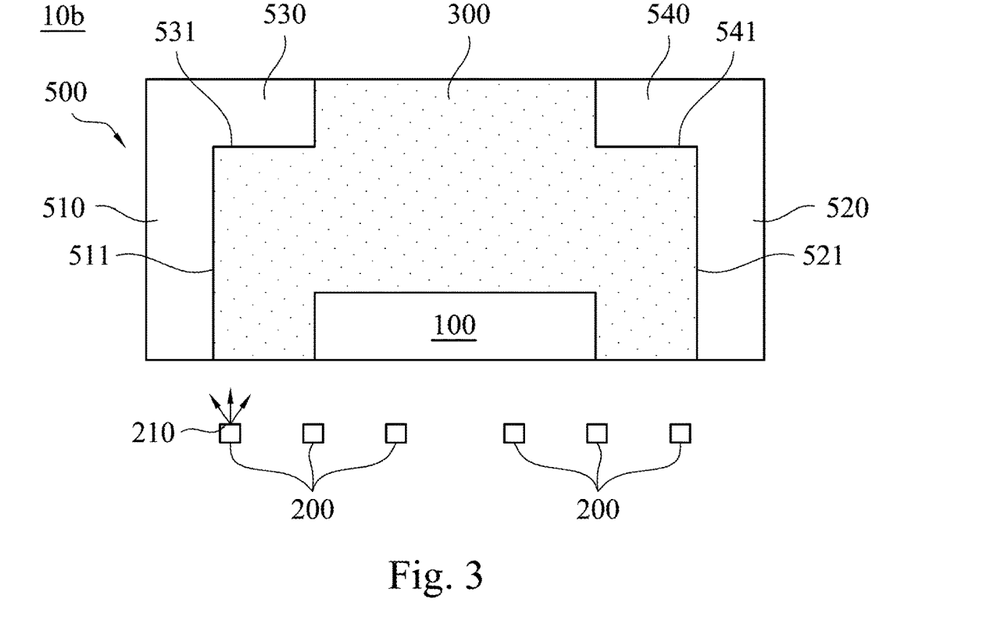
FIG. 3 is a cross-sectional view of a display apparatus in accordance with another embodiment of the present disclosure.

FIG. 3 is a cross-sectional view of a display apparatus 10b in accordance with another embodiment of the present disclosure. As shown in FIG. 3, the main difference between the display apparatus 10b and the display apparatus 10a shown in FIG. 2 is that: a frame 500 is different from the foregoing frame 400. Specifically, the frame 500 includes a first protrusion 530 and a second protrusion 540. The first protrusion 530 protrudes from a first inner frame wall 511 of a first frame portion 510. The second protrusion 540 protrudes from a second inner frame wall 521 of a second frame portion 520. A portion of the light guide glue 300 is located between a light source 200 and the first protrusion 530, so the light emitted from the light source 200 to the light guide glue 300 can be reflected by the first protrusion 530. Similarly, another portion of the light guide glue 300 is located between another light source 200 and the second protrusion 540, so the light emitted from the light source 200 to the light guide glue 300 can be reflected by the second protrusion 540. As a result, the first protrusion 530 and the second protrusion 540 can be beneficial for improving the light guiding ability of the light guide glue 300.

In some embodiments, a reflective material layer (e.g., silver layer) can be disposed on an inner surface 531 of the first protrusion 530 and an inner surface 541 of the second protrusion 540, assisting in reflecting the light from the light guide glue 300. A shape of the inner surface 531 and the inner surface 541 can be planar or arc-shaped.

Figure 4:
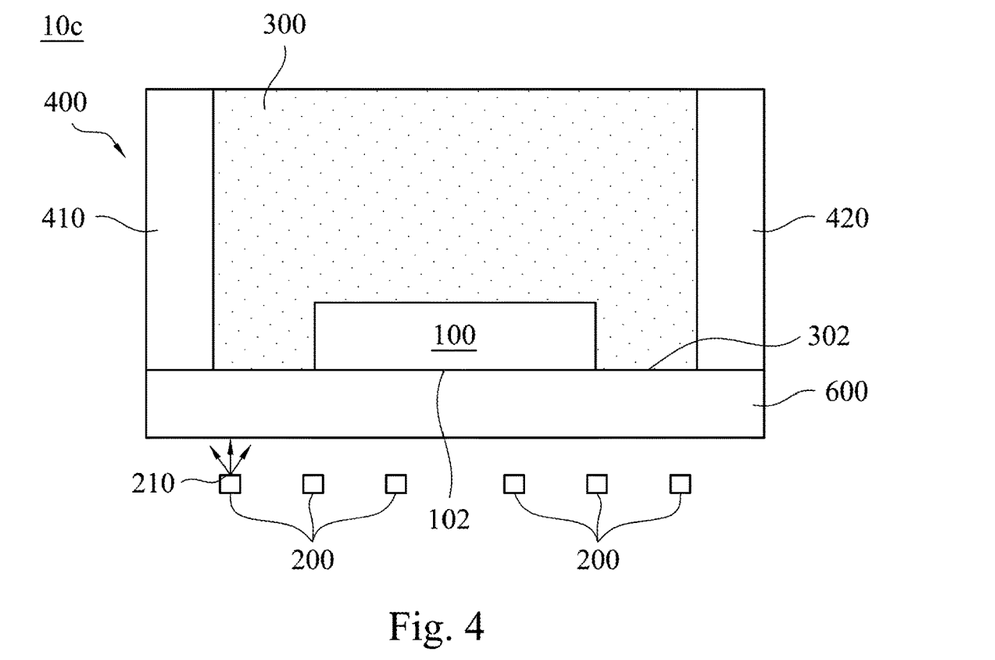
FIG. 4 is a cross-sectional view of a display apparatus in accordance with another embodiment of the present disclosure.

FIG. 4 is a cross-sectional view of a display apparatus 10c in accordance with another embodiment of the present disclosure. As shown in FIG. 4, the main difference between the display apparatus 10c and the display apparatus 10a shown in FIG. 2 is that: the present embodiment can further include a support substrate 600 supporting the display panel 100, the light guide glue 300 and the frame 400. In particular, the support substrate 600 can extend along the non-display surface 102 of the display panel 100 and the lower surface 302 of the light guide glue 300 to a lower surface of the frame 400. The support substrate 600 can therefore support the display panel 100, the light guide glue 300 and the frame 400. The support substrate 600 and the frame 400 can define the space S accommodating the display panel 100 and the light guide glue 300. In some embodiments, the light guide glue 300 can be in contact with the support substrate 600, the display panel 100 and the frame 400 so as to adhere the support substrate 600, the display panel 100 and the frame 400 together. In another embodiment, the support substrate 600 and the frame 400 can be monolithically connected.

Figure 5:
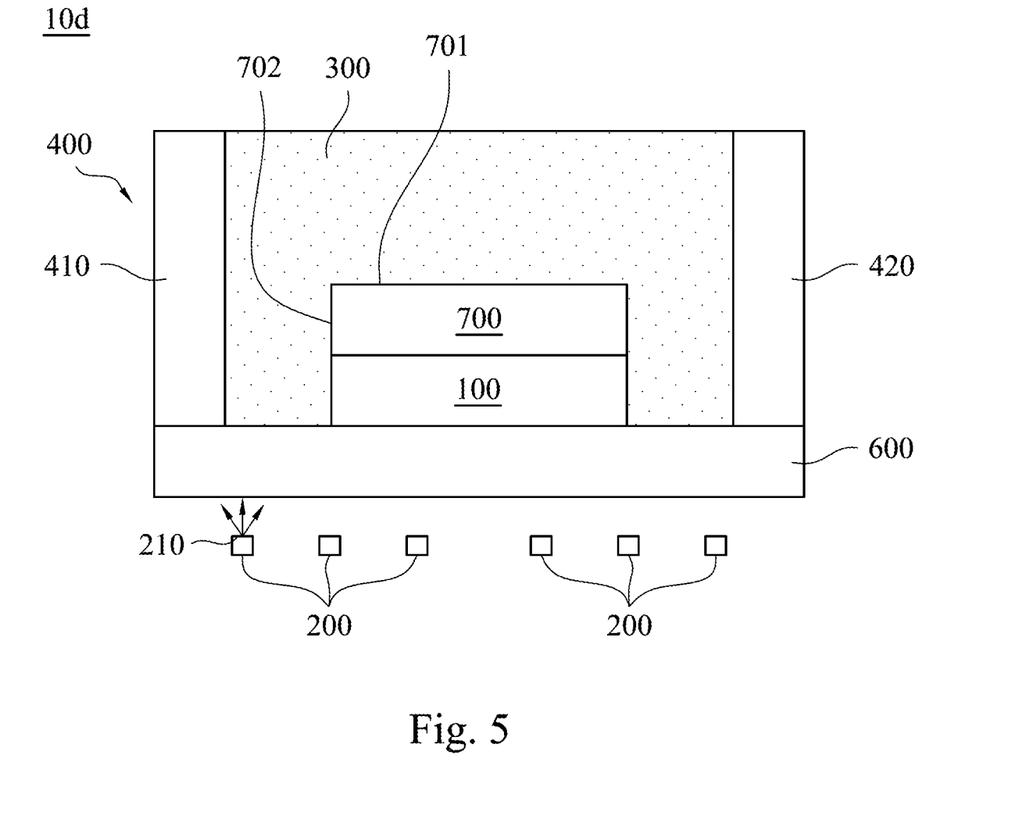
FIG. 5 is a cross-sectional view of a display apparatus in accordance with another embodiment of the present disclosure.

FIG. 5 is a cross-sectional view of a display apparatus 10d in accordance with another embodiment of the present disclosure. As shown in FIG. 5, the main difference between the display apparatus 10d and the display apparatus 10c shown in FIG. 4 is that: the display apparatus 10d can further include a stack 700 located on the display panel 100 and adhered by the light guide glue 300. In some embodiments, the stack 700 can be, but is not limited to, a touch panel, a cover lens or a stack of both of a touch panel and a cover lens. As shown in FIG. 5, the stack 700 has an upper surface 701 and a sidewall 702 extending downward from the upper surface 701. The light guide glue 300 can be in contact with the upper surface 701 and the sidewall 702 of the stack 700 so as to stably adhere to the stack 700.

Figure 6A:
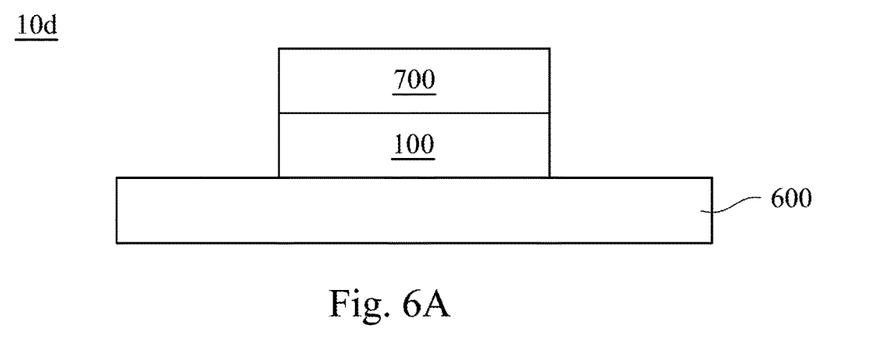
FIGS. 6A-6E are cross-sectional views of different intermediate stages of manufacturing process of the display apparatus shown in FIG. 5.

FIGS. 6A-6E are cross-sectional views of different intermediate stages of manufacturing process for the display apparatus 10d. As shown in FIG. 6A, at first, the stack 700 can be disposed on the display panel 100, and then the display panel 100 is disposed on the support substrate 600. In another embodiment, at first, the display panel 100 can also be disposed on the support substrate 600, and then the stack 700 is disposed on the display panel 100.

Figure 6B:
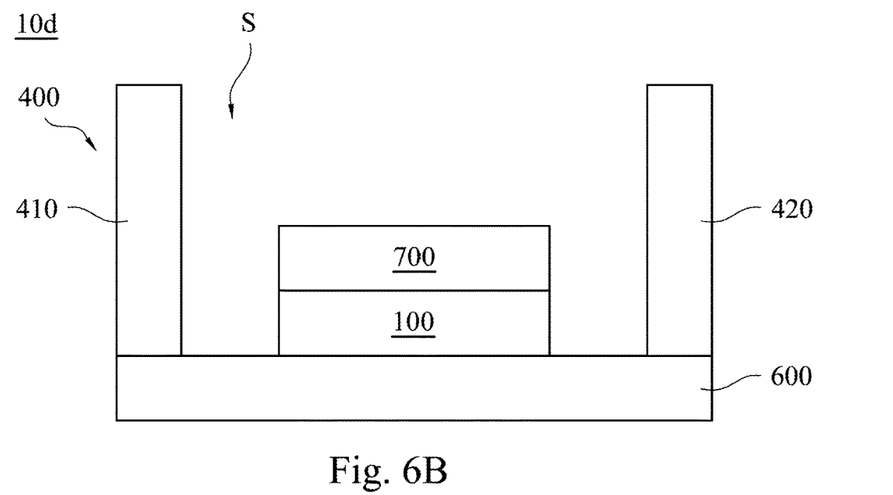

Then, as shown in FIG. 6B, the frame 400 can be disposed on the support substrate 600. In another embodiment, the support substrate 600 and the frame 400 can be disposed in advance or can be monolithically connected.

Afterwards, the stack 700 and the display panel 100 are disposed on the support substrate 600.

Figure 6C:
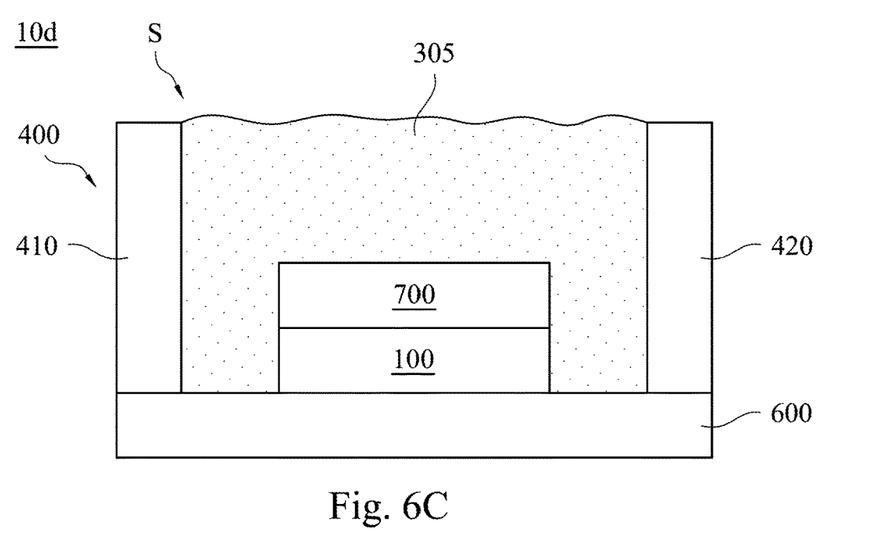
Figure 6D:
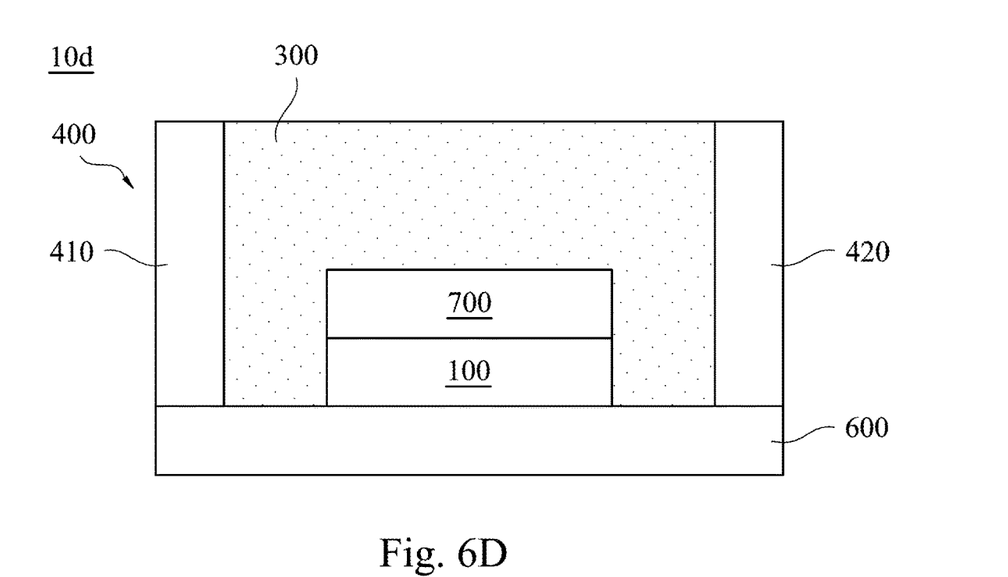

Subsequently, as shown in FIG. 6C, a flowable light guide glue 305 can be injected into the space S defined by the frame 400 until the space S is filled with the flowable light guide glue 305. Afterwards, the flowable light guide glue 305 is cured as the foregoing light guide glue 300. A grinding or polishing process is then performed to planarize the cured light guide glue 300, and the structure formed by these two steps can be shown in FIG. 6D. In some embodiments, the foregoing curing process can be, but is not limited to, a photo curing process or a thermal curing process.

Figure 6E:
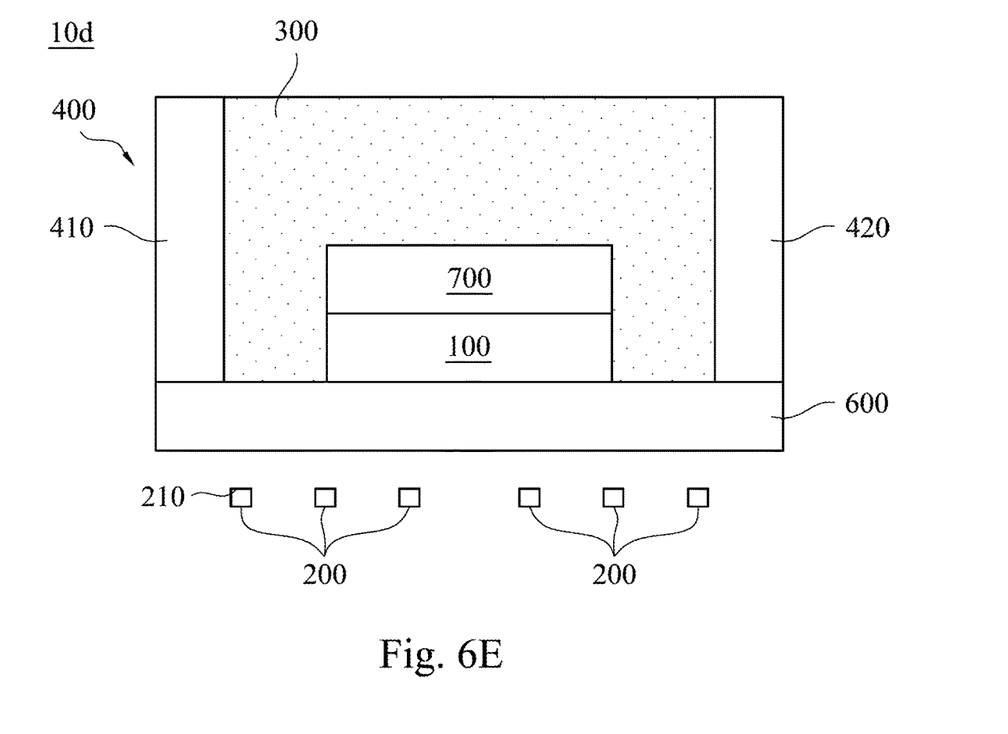

Finally, as shown in FIG. 6E, one or more light sources 200 can be disposed on a back side of (or below) the support substrate 600. Although in the foregoing embodiment, all the light sources 200 are disposed on the back side of (or below) the display panel 100, the present disclosure is not limited to such a configuration.

Figure 7:
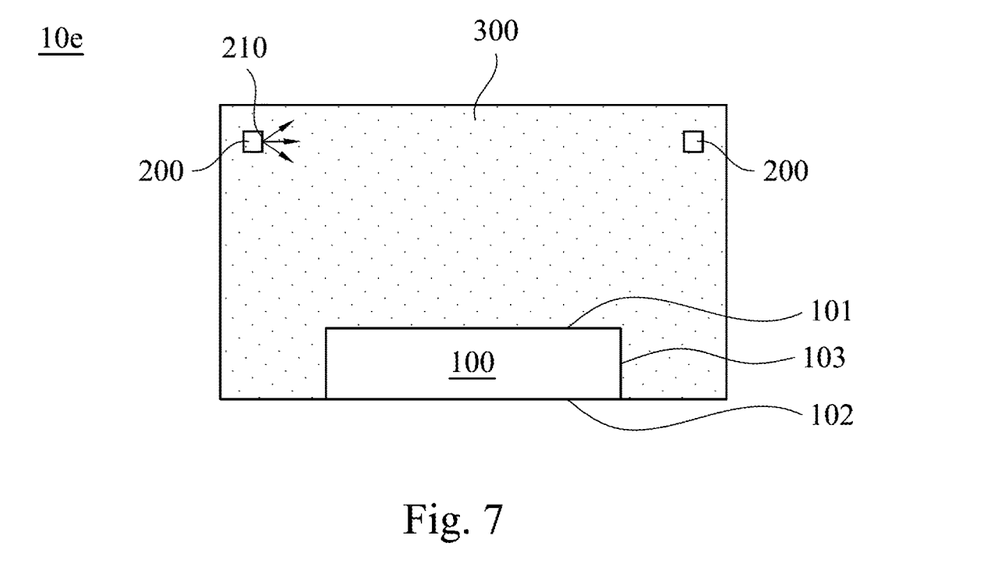
FIG. 7 is a cross-sectional view of a display apparatus in accordance with another embodiment of the present disclosure.

For example, in a display apparatus 10e shown in FIG. 7, the light source 200 can be disposed on a front side of the display panel 100. In other words, the light source 200 can be located in a position higher than the display surface 101 of the display panel 100. In particular, the light source 200 is located above the display surface 101, and the non-display surface 102 is located under the display surface 101, so the light source 200 and the non-display surface 102 can located on the two opposite sides of the display surface 101. It will be appreciated that while the embodiment, shown in FIG. 7, does not illustrate the light located on the back side of (or below) the display panel 100, in other embodiments, one or more light sources 200 can be disposed on the back side of (or below) the display panel 100.

Although FIG. 1 illustrates the embodiment of the light source 200 disposed on the back side of the display panel 100 and FIG. 7 illustrates the embodiment of the light source 200 disposed on the front side of the display panel 100, in other embodiments, the light source 200 can be disposed on other positions. For example, the light source 200 can be, but is not limited to, disposed beside the sidewall 103 of the display panel 100.

Figure 8:
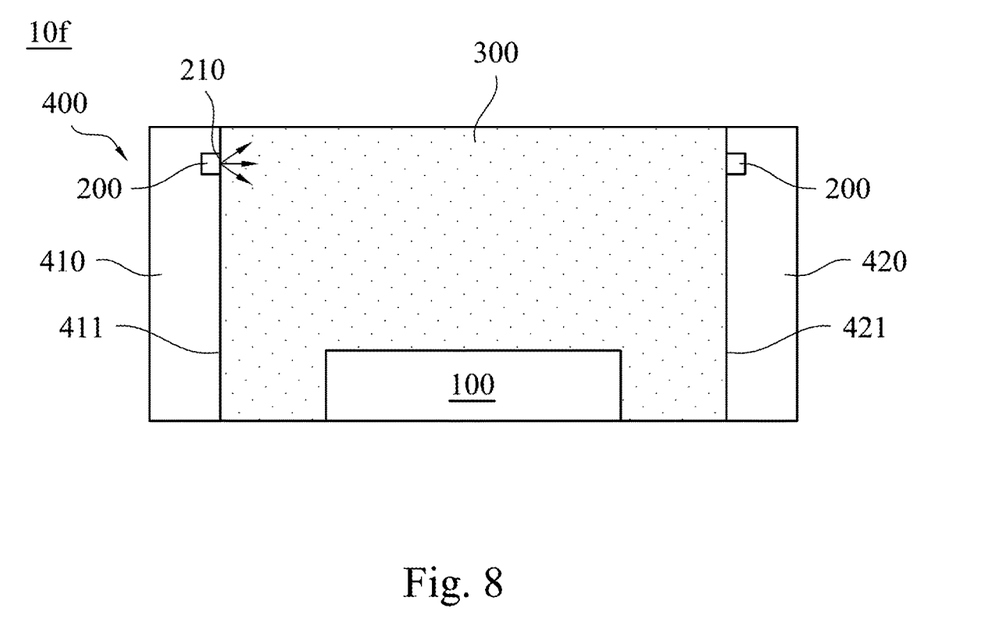
FIG. 8 is a cross-sectional view of a display apparatus in accordance with another embodiment of the present disclosure.

FIG. 8 is a cross-sectional view of a display apparatus 10f in accordance with another embodiment of the present disclosure. As shown in FIG. 8, the main difference between the display apparatus 10f and the display apparatus 10e shown in FIG. 7 is that: the light source 200 can be disposed on the frame 400. For example, a light source 200 can be embedded in the first inner frame wall 411 of the first frame portion 410, and another light source 200 can be embedded in the second inner frame wall 421 of the second frame portion 420. The two light sources 200 embedded in the frame 400 can both emit light toward the light guide glue 300, and the light guide glue 300 can guide the light to the display panel 100. Similarly, in another embodiment, the light source 200 can also be embedded in the support substrate 600, as shown in FIG. 5.

Figure 9:
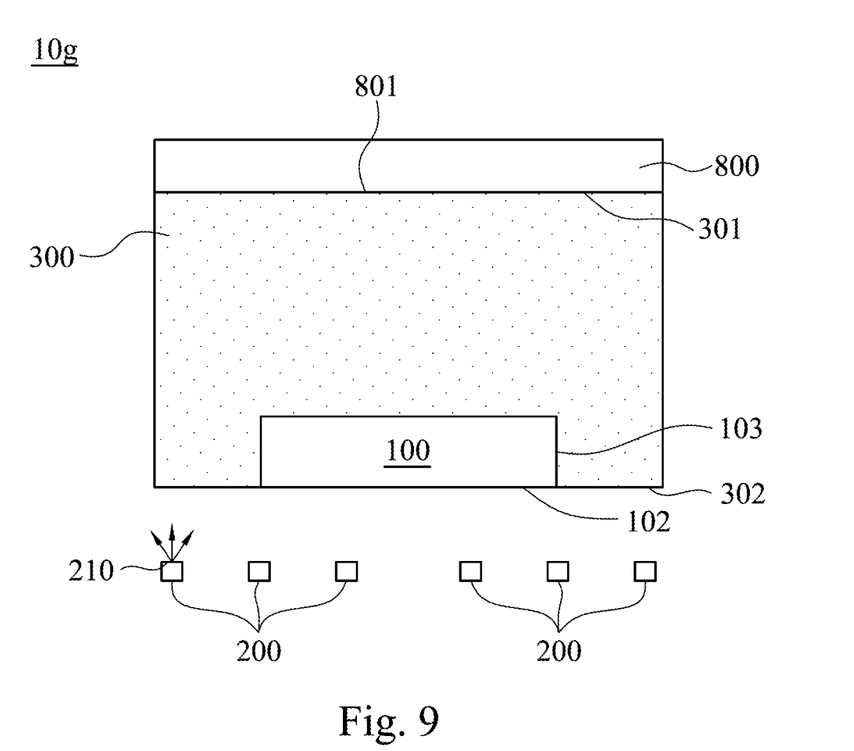
FIG. 9 is a cross-sectional view of a display apparatus in accordance with another embodiment of the present disclosure.

FIG. 9 is a cross-sectional view of a display apparatus 10g in accordance with another embodiment of the present disclosure. As shown in FIG. 9, the main difference between the display apparatus 10g and the display apparatus in the foregoing embodiments is that: the display apparatus 10g further includes a cover lens 800 covering the light guide glue 300. In other words, a portion of the light guide glue 300 is located between the display panel 100 and the cover lens 800. The cover lens 800 is light permeable or transparent. Therefore, the cover lens 800 not only protects the light guide glue 300 but also allows the light in the light guide glue 300 to go out of the display apparatus 10g through the cover lens 800, which allows a viewer to see the image displayed by the display panel 100.

In some embodiments, the cover lens 800 is adhered by the light guide glue 300. That is to say, other adhesives of fixing structures are absent between the cover lens 800 and the light guide glue 300, and the light guide glue 300 can fix the cover lens 800 by its stickiness. Specifically, the upper surface 301 of the light guide glue 300 can be in contact with the lower surface 801 of the cover lens 800 so as to adhere the cover lens 800. In this embodiment, the light guide glue 300 can adhere the display panel 100 and the cover lens 800 together. Moreover, in other embodiments, if the display apparatus 10*g* include the foregoing frame 400 (or 500), the support substrate 600 and/or the stack 700, the light guide glue 300 can adhere the display panel 100, the frame 400 (or 500), the support substrate 600, the stack 700 and/or the cover lens 800 together.

In other embodiments, other adhesives or fixing structures may also be disposed between the cover lens 800 and the light guide glue 300. In this embodiment, the cover lens 800 may be not in contact with the light guide glue 300.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display apparatus, comprising:
   a light source;
   a display panel including a display surface and a sidewall extending downward from the display surface; and
   a light guide glue in contact with the display surface and the sidewall of the display panel to adhere to the display panel, wherein the display panel is embedded in the light guide glue, a light travel path from the light source to the display panel passes through the light guide glue, and the light travel path from the light source to the display panel is free from passing a light guide plate.

2. The display apparatus of claim 1, wherein the display panel has a non-display surface opposite to the display surface, and a minimum distance between the light guide glue and the light source is less than a minimum distance between the display surface and the light source.

3. The display apparatus of claim 1, wherein the display panel has a non-display surface opposite to the display surface, wherein the display surface and the light source are respectively located on opposite sides of the non-display surface.

4. The display apparatus of claim 1, wherein the display panel has a non-display surface opposite to the display surface, wherein the light source and the non-display surface are respectively located on opposite sides of the display surface.

5. The display apparatus of claim 1, wherein the light guide glue has a recess, and the display panel is embedded in the recess, wherein the display surface is in contact with a surface of the recess.

6. The display apparatus of claim 1, further comprising:
   a frame defining a space, the display panel being located in the space, the space being filled with the light guide glue.

7. The display apparatus of claim 6, wherein the frame comprises a first frame portion and a second frame portion opposite to each other, and a portion of the light guide glue is located between the first frame portion and a sidewall of the display panel.

8. The display apparatus of claim 7, further comprising:
   a support substrate, wherein the support substrate and the frame define the space.

9. The display apparatus of claim 7, further comprising:
   a protrusion protruding from an inner frame wall of the frame, a portion of the light guide glue being located between the light source and the protrusion.

10. The display apparatus of claim 7, wherein the light source is embedded in the frame.

11. The display apparatus of claim 7, wherein the light guide glue has an upper surface, the frame has a top surface, and the upper surface of the light guide glue is level with the top surface of the frame.

12. The display apparatus of claim 1, further comprising:
    a support substrate extending along a non-display surface of the display panel and a lower surface of the light guide glue.

13. The display apparatus of claim 1, further comprising:
    a stack located on the display panel and adhered by the light guide glue.

14. The display apparatus of claim 1, further comprising:
    a cover lens covering the light guide glue, where in the cover lens is light permeable.

15. A method for manufacturing the display apparatus as claimed in claim 1, comprising:
    providing a frame with a space;
    depositing the display panel and the light source in the space; and
    filling the light guide glue in the space to cover or encapsulate the display panel.

* * * * *